Patented Mar. 20, 1934

1,951,889

UNITED STATES PATENT OFFICE 1,951,889

METHOD OF PREPARING DRIED EGG PRODUCT

Samuel Tranin, Kansas City, Mo.

No Drawing. Application January 15, 1932,
Serial No. 586,970

2 Claims. (Cl. 99—5)

This invention relates to normally liquid food products and more particularly to food ingredients, such as liquid egg, which are conditioned by dehydration, freezing, or like processes for storage and shipment, and methods of preparing the products.

The principal objects of this invention are to conserve and enhance the natural properties of raw, normally liquid foods, and to prevent deterioration of the quality of liquid foods by processes of preparing the foods for storage and shipment.

Liquid eggs tend to lose desirable volatile constituents, and are subject to deterioration by atmospheric air, when prepared by ordinary means. Particular objects of this invention, therefore, are to increase the desirable gaseous content of dried and frozen egg, and to protect the egg from the unfavorable effects of contact with air before, during and after the eggs are conditioned for storage or shipment.

In accomplishing these and other objects of the invention, I have devised novel steps in the preparation of liquid egg for the market, as presently disclosed. The novel method may be carried out by employing equipment well known in dehydration, spraying and freezing industries, and which, therefore, need not be described in detail.

In one aspect the invention consists in adding a volatile agent to a body of raw food in the liquid state, and treating the body to retain the agent, whereby a food may be provided having an increased content of volatile substances. This aspect of the invention will first be described in its application to the treatment of commercial raw, broken egg to provide a product adapted for use by bakers.

The ordinary liquid egg product of commerce, while wholesome and heretofore considered satisfactory, has been deficient in some properties, chiefly by lacking the beating quality of freshly broken eggs. One reason for the deficiency specified is the escape of volatile substances, such as carbon dioxide, from the liquid egg between the time of breaking the eggs in the factory and their use by the baker. When the liquid eggs are frozen for storage and shipment, the loss of carbon dioxide may be due to the length of time the broken eggs are exposed to air before, during and after freezing, whereby a substantial proportion of the volatile substances is allowed to escape. When the liquid egg is dehydrated to provide solid particles of dried egg, the volatile substances, including carbon dioxide, are dissipated with the water moisture in the evaporation chamber.

I have found that a volatile substance harmless in food may be added to the liquid food to assure the desirable properties in the product when used by the baker, and that retention of the volatile agent may be assured by the use of novel treating steps in the process of conditioning the food for storage or shipment. In preparing an egg product, therefore, I add an agent, such as a gas, and preferably a gas such as carbon dioxide normally present in broken eggs, and treat the eggs for preservation, in such a manner as to conserve the carbon dioxide content of the mixture and protect the egg from contamination.

Preferred steps in the preparation of dried egg will first be described in detail, to illustrate the use of the invention and indicate the advantages of the product due to the novel steps of manufacture.

A body of broken egg, consisting of whole egg, whites or yolks, from which fibrous matter has been removed, is thoroughly mixed or cut up while excluded from air and thus a homogeneous mass is produced without beating up the egg. A protective substance is mixed with the mass of egg, preferably during the cutting-up step, to conserve the desirable constituents of the egg when the mass is sprayed into an oven as presently described.

The protective substance may consist of any one of several classes of materials such as gums, casein, glycerine, salt and sugar which tend to form seals to prevent escape of volatile constituents of egg. I have found the most useful protective agents are water-soluble substances such as sugar, salt and glycerine having the common characteristic that they tend to pass quickly from the interior to the surface of large or small portions of liquid foods and collect on the surface to form substantially continuous coatings.

I have found that sugar and salt give the best protection, by forming coatings of crystals on egg particles, the salt giving about 60 per cent as much protection as sugar, while glycerine gives about 40 per cent the protection afforded by sugar. I, therefore, mix about 5 per cent of sugar with the body of broken egg, preferably dissolving the sugar in the egg.

The mixture, protected from contact with air, is prepared in or transferred to an air-tight tank, and a tube having an inlet adjacent the bottom of the tank is provided with a small outlet nozzle for delivering the mixture in a thin stream into a drying oven. Sufficient pressure, for example 10 pounds, is maintained on the mixture in the tank to move the mixture through the tube and nozzle at low velocity. This pressure is preferably maintained by delivering a gas into the top of the tank to act on the body of liquid therein. The gas may consist of air mixed with carbon dioxide, but preferably comprises carbon dioxide, thus avoiding possibility of contact of deleterious gases such as uncleaned atmospheric air with the liquid food, by which the egg might be oxidized or contaminated.

The pressure under which the liquid passes from the tank to the oven is insufficient to create a spray. In order to atomize the liquid, I provide coaxial nozzles, such as well known in the atomizing, liquid mixing and spraying arts, comprising a nozzle having a small central outlet for liquid, and an annular nozzle surrounding the liquid outlet. I then discharge a treating gas, heavier than air, at substantial pressure, for example 60 pounds, through the annular nozzle. The treating gas may consist of air mixed with carbon dioxide, but I preferably select substantially pure carbon dioxide as the propelling gas, one reason being that liquid egg normally contains carbon dioxide, and another that carbon dioxide when mixed with egg will increase the beating-up quality of the egg. The carbon dioxide may be supplied from a tank containing the gas in liquid form, and pass from the tank to a compressor for delivery to the nozzles.

The annular current of carbon dioxide discharged around the solid stream of liquid egg performs several functions. The hollow stream of carbon dioxide under pressure tends to create a vacuum and moving at relatively high velocity distributes and dissipates the liquid egg, accelerating and breaking up the solid stream and atomizing or spraying the liquid egg into the oven.

The conduit for liquid egg may extend upwardly in the egg tank from the bottom and have a laterally directed outlet. The current of carbon dioxide may carry the egg particles a substantial distance, for example spraying the particles across a 20-foot drying chamber.

Air may be passed through the chamber to take up and carry away moisture, the air exhausted being mixed with carbon dioxide.

The hollow stream of carbon dioxide also acts as a shield or cover for the stream of liquid egg, and for the droplets into which the stream of egg is broken. Among the protective effects of the carbon dioxide are the insulation of the food stream and particles from atmospheric air and air in the oven, and the retention of volatile constituents of the egg particles.

The carbon dioxide discharged into the oven also tends to form an atmosphere of carbon dioxide in the oven for drying the egg particles. The process thus obviates possible contamination of egg by air, and contact and absorption of air by the egg particles which would incur possible deterioration of the egg. Carbon dioxide mixes with the egg particles and is incorporated in the particles, thus increasing the carbon dioxide content of the egg.

When the moisture starts to go out of the egg particles under the influence of the heat of the oven, the sugar comes to the surfaces of the particles, and both insulate the egg from heat to avoid coagulation, and tend to retain volatile content of egg particles such as carbon dioxide.

Relatively high temperature, for example 200° F., may be maintained in the oven, to promote and expedite dehydration, without danger of damage to the egg. The coating substance both insulates the heat-susceptible egg constituents and protects the egg from air, and the carbon dioxide protects the egg from air both by providing a carbon dioxide atmosphere and by becoming incorporated with the egg particles.

The particles of dried egg, coated with sugar crystals which retain $CO_2$, are collected and packaged. When water is added the sugar coatings dissolve immediately. If the mass is beaten up at once, it will have 10 to 15 per cent bigger volume than dried egg produced by ordinary methods and lacking the added $CO_2$. Cake made from dried eggs treated as described will have 8 to 10 per cent more volume and also will have other higher qualities, such as better texture, than cake made with commercial broken egg produced by ordinary methods.

When salt is used to form the protective coating on egg particles, the product is particularly suitable for manufacture of commodities, such as mayonnaise, which are normally seasoned with salt.

When the improved method of preparing a liquid egg product is employed for producing frozen egg, the combined streams of egg and carbon dioxide are discharged into a refrigerating chamber where sprayed particles will be frozen and fall in a form resembling snow, or to a refrigerated roller. The carbon dioxide propels the egg through the chamber, or to the roller, and mixes with the spray droplets to incorporate the carbon dioxide with the egg. As in the case of atomizing in an oven, each minute particle of egg will then contain added carbon dioxide, and the atmosphere in the refrigerating chamber will consist largely of carbon dioxide.

I have found that the retention of carbon dioxide in egg particles is promoted, and the quality of the product improved, when the rate of freezing is rapid, so that the droplets congeal into crystals quickly after entering the chamber, and almost instantly upon being deposited on a roller. When carbon dioxide is mixed with liquid egg, and the mixture is frozen quickly, an excess of carbon dioxide and absence of air in the egg are assured. The frozen egg, when melted and immediately beaten up, will have a substantially larger volume and produce cake of larger volume than frozen eggs prepared by ordinary methods.

The improved method may be adapted by ordinary skill to the production of foods in any type of apparatus. For example, liquid egg containing added carbon dioxide may be frozen quickly in a tank in which the mixture is produced, or may be delivered to a belt in an evaporating chamber for producing flaky egg.

It is apparent, therefore, that I have provided useful improvements in methods of preparing food products and ingredients, whereby desirable properties are conserved and enhanced, and whereby novel products may be prepared, including raw broken egg uncontaminated and not affected chemically by air or oxygen, and therefore more wholesome and having improved qualities for treatment by users and incorporation in foods.

What I claim and desire to secure by Letters Patent is:

1. The method of treating liquid egg including dissolving sugar in liquid egg to form a liquid egg mixture, spraying the egg mixture with carbon-dioxide gas to effect atomization of the liquid egg and absorption of the carbon-dioxide gas by the atomized egg particles, applying heat to the egg particles to effect formation of a glazed coating about each particle for retention of the absorbed carbon-dioxide gas in the egg particles.

2. The method of drying liquid egg including dissolving sugar in liquid egg to form a liquid egg mixture, spraying the egg mixture with carbon-dioxide gas to effect atomization of the liquid egg and absorption of carbon-dioxide gas by the atomized egg particles, and applying heat to the egg particles while in a confined body of carbon-dioxide gas to effect formation of a glazed protective coating about each particle for retention of the absorbed carbon-dioxide gas in the egg particles.

SAMUEL TRANIN.